(12) United States Patent
Kim et al.

(10) Patent No.: US 10,565,050 B2
(45) Date of Patent: Feb. 18, 2020

(54) MEMORY CONTROLLER, MEMORY SYSTEM AND APPLICATION PROCESSOR COMPRISING THE MEMORY CONTROLLER

(71) Applicant: Samsung Electronics Co., Ltd., Suwon-si, Gyeonggi-do (KR)

(72) Inventors: Tae-hun Kim, Hwaseong-si (KR); Yong-sang Yu, Hwaseong-si (KR); Man-hwee Jo, Seoul (KR); Min-young Joe, Suwon-si (KR); Ji-woong Kim, Hwaseong-si (KR); Nak-hee Seong, Gwacheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 55 days.

(21) Appl. No.: 15/898,784

(22) Filed: Feb. 19, 2018

(65) Prior Publication Data
US 2019/0050316 A1   Feb. 14, 2019

(30) Foreign Application Priority Data
Aug. 10, 2017   (KR) .......................... 10-2017-0101705

(51) Int. Cl.
*G06F 11/10* (2006.01)
*G06F 11/30* (2006.01)
*G06F 3/06* (2006.01)
*G06F 11/34* (2006.01)

(52) U.S. Cl.
CPC ........ *G06F 11/1048* (2013.01); *G06F 3/0619* (2013.01); *G06F 11/3093* (2013.01); *G06F 11/3442* (2013.01)

(58) Field of Classification Search
CPC ...... G06F 3/0619; G06F 3/0629; G06F 11/10; G06F 11/1048; G06F 11/3442; G06F 11/3093
See application file for complete search history.

(56) References Cited

U.S. PATENT DOCUMENTS

| | | |
|---|---|---|
| 5,606,662 A | 2/1997 | Wisor |
| 5,896,404 A | 4/1999 | Kellogg et al. |
| 6,070,262 A | 5/2000 | Kellogg et al. |
| 7,451,380 B2 | 11/2008 | Carnevale et al. |
| 7,464,241 B2 | 12/2008 | Vogt |
| 8,756,398 B2 | 6/2014 | Uhlaender |
| 9,280,418 B2 | 3/2016 | Kao et al. |
| 9,490,847 B2 | 11/2016 | Gruner et al. |

(Continued)

OTHER PUBLICATIONS

"DesignWare Cores Enhanced Universal DDR Memory Controller (uMCTL2) Databook" Synopsys, pp. 1-1,382 (2017).

*Primary Examiner* — Shelly A Chase
(74) *Attorney, Agent, or Firm* — Harness, Dickey & Pierce, P.L.C.

(57) ABSTRACT

According to an aspect of inventive concepts, there is provided a memory controller configured to control a memory device including a plurality of memory pages, the memory controller including an error correction code (ECC) region manager configured to manage the plurality of memory pages by dividing the plurality of memory pages into ECC enable regions and ECC disable regions, and an ECC engine configured to perform an ECC operation on data included in the ECC enable regions.

20 Claims, 14 Drawing Sheets

(56) References Cited

U.S. PATENT DOCUMENTS

| | | |
|---|---|---|
| 9,646,718 B2 | 5/2017 | Park et al. |
| 2007/0133331 A1 | 6/2007 | Park et al. |
| 2015/0058697 A1* | 2/2015 | Iwasaki ............... G06F 11/1048 714/773 |
| 2016/0350180 A1 | 12/2016 | Halbert et al. |
| 2017/0242609 A1* | 8/2017 | Kim ..................... G06F 3/0629 |

* cited by examiner

MEMORY CONTROLLER, MEMORY SYSTEM AND APPLICATION PROCESSOR COMPRISING THE MEMORY CONTROLLER

CROSS-REFERENCE TO RELATED APPLICATION

This application claims the benefit of Korean Patent Application No. 10-2017-0101705, filed on Aug. 10, 2017, in the Korean Intellectual Property Office, the disclosure of which is incorporated herein in its entirety by reference.

BACKGROUND

Inventive concepts relate to a memory controller, and more particularly, to a memory controller and/or a method of controlling a memory device storing error correction code (ECC) data.

With the development of technology, semiconductor memory devices are increasing in capacity and speed. As one example of a semiconductor memory device, a volatile memory device, such as a DRAM device, may determine data by charge stored in a capacitor, and may erase the stored data when power supply is shut down.

As the operation of a semiconductor memory device increases in speed, the error probability of storing data increase. In order to prevent, or reduce the likelihood of, performance degradation due to increased error occurrence, various measures for correcting errors are proposed.

SUMMARY

Inventive concepts provide a device and/or a method for a memory controller, a memory system and an application processor. In one embodiment, the memory controller is divided regions of an in-band ECC memory device and performs an ECC operation on data of a memory page set as an ECC enable region.

According to an example embodiment of inventive concepts, there is provided a memory controller configured to control a memory device including a plurality of memory pages, the memory controller including an error correction code (ECC) region manager configured to manage the plurality of memory pages by dividing the plurality of memory pages into ECC enable regions and ECC disable regions, and an ECC engine configured to perform an ECC operation on data included in the ECC enable regions.

According to an example embodiment of inventive concepts, there is provided a memory system including a memory device configured to include a plurality of memory pages, and a memory controller configured to control the memory device. The memory controller is configured to manage the plurality of memory pages by dividing the plurality of memory pages into ECC enable regions and ECC disable regions and is configured to store ECC data and normal data in the ECC enable regions.

According to an example embodiment of inventive concepts, there is provided an application processor including a memory controller configured to control an external memory device comprising a plurality of memory pages, and a processor configured to transmit data address to the memory controller. The memory controller is configured to receives data from the external memory device or the processor and is configured to determine whether ECC operation is performed on the received data based on the data address.

BRIEF DESCRIPTION OF THE DRAWINGS

Embodiments of inventive concepts will be more clearly understood from the following detailed description taken in conjunction with the accompanying drawings in which.

DETAILED DESCRIPTION OF THE EMBODIMENTS

In the following description illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), Systems on Chip (SoCs), field programmable gate arrays (FPGAs), computers, or the like.

As used herein, terms such as "managers," "units," "controllers," "engines," etc. may be or may include hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as controllers, processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Figure 1:
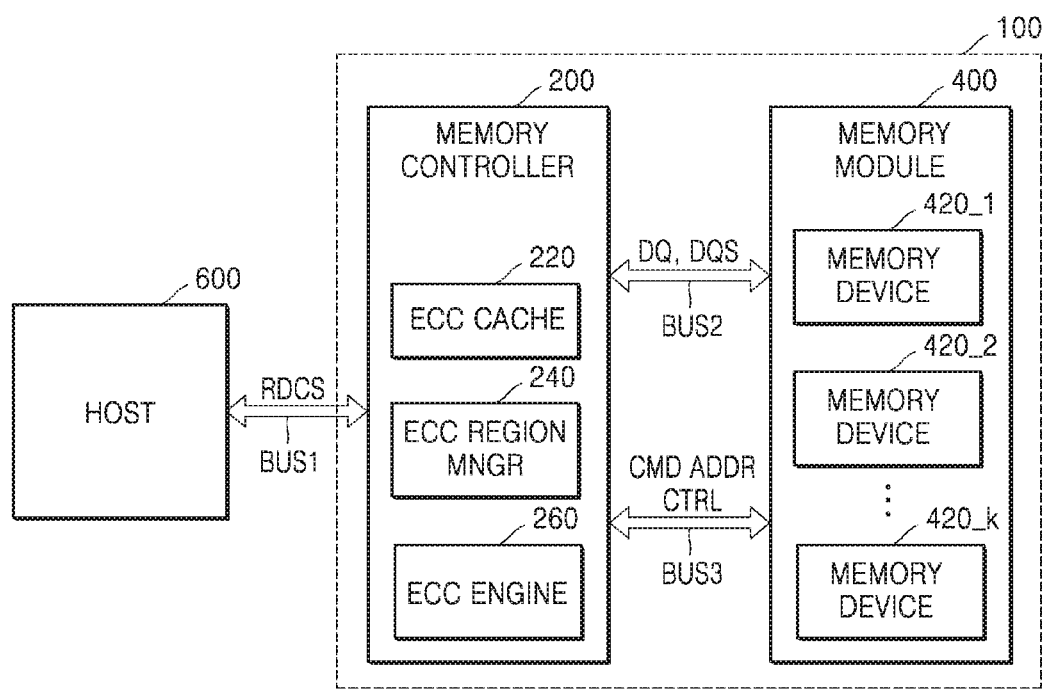
FIG. 1 illustrates an electronic system including a memory system according to an example embodiment of inventive concepts.

FIG. 1 illustrates an electronic system 10 including a memory system 100 according to an example embodiment of inventive concepts.

The electronic system 10 may include the memory system 100 and a host 600. The memory system 100 may include a memory controller 200 and a memory module 400. The memory controller 200 and the host 600 may exchange various data, data address information, and/or the like. The memory controller 200 and the memory module 400 may exchange various signals (DQ, DQS, CLK, etc) through a BUS2 and a BUS3. The electronic system 10 may be used in various electronic devices requiring or utilizing memory such as servers, desktops, laptops, smart phones, tablet PCs, printers, scanners, monitors, digital cameras, digital music players, digital media recorders, and/or portable game consoles, but inventive concepts are not limited thereto.

The memory module 400 may temporally, or temporarily, save data processed or to be processed by a processor and may be used as an operation memory, a working memory, and/or a buffer memory in a computing system. The memory module 400 may include one or more memory ranks. The memory module 400 may be embodied as a single in-line memory module (SIMM), a dual in-line memory module (DIMM), a small-outline DIMM (SO-DIMM), an unbuffered DIMM (UDIMM), a fully-buffered DIMM (FB-DIMM), a rank-buffered DIMM (RBDIMM), a mini-DIMM and a micro-DIMM and may also be embodied as a registered DIMM (RDIMM) or a load-reduced DIMM (LRDIMM) that is usually used in a server.

The memory module 400 may include a plurality of memory devices 420_1 to 420_k (k is a natural number). Each of the memory devices 420_1 to 420_k may be or may include a volatile memory such as dynamic random access memory (DRAM), synchronous DRAM (SDRAM), double data rate SDRAM (DDR SDRAM), low power double data rate SDRAM (LPDDR SDRAM), graphics double data rate SDRAM (GDDR SDRAM), rambus DRAM (RDRAM), and/or static RAM (SRAM) and may be or may include a nonvolatile memory such as phase-change RAM (PCRAM), magneto-resistive RAM (MRAM), ReRAM, ferro-electric RAM (FRAM), and/or a flash memory. Also, each of the memory devices 420_1 to 420_k may be or may include any DRA chip according to various standards such as DDR, DDR2, DDR3, DDR4, DDR5, LPDDR1, LPDDR2, LPDDR3 and/or LPDDR4.

Hereinafter, descriptions will be provided such that each of the memory devices 420_1 to 420_k is a DRAM chip. However, the type of the memory devices 420_1 to 420_k is not limited thereto and they may include different types of chips.

The memory module 400 may be or may include an error correction code (ECC) memory module including ECC data. The ECC memory module may be or may include a side-band memory module that stores ECC data on a separate chip from normal data and may be an in-band memory module that stores ECC data on the same chip as normal data. The normal data may be referred to as actual data. In the case of the side-band memory module, a separate chip is required to store ECC data, which may incur costs. Hereinafter, the memory module 400 will be described as an in-band memory module, and at least one of the memory devices 420_1 to 420_k stores both normal data and ECC data.

The memory controller 200 may provide an interface to the memory module 400 to manage the flow of data to or from the memory module 400. The memory controller 200 may be connected to the host 600 outside the memory system 100, such as a processor, and may communicate with the host 600 through at least one of various interface protocols such as USB, MMC, PCIe, advanced technology attachment (ATA), serial-ATA, parallel-ATA, SCSI, ESDI, and integrated drive electronics (IDE), and may communicate with the host 600 through a BUS such as a BUS1. The memory controller 200 may be embodied as a separate chip, may be integrated with the memory module 400, or may be embodied as a single chip such as a system on chip (SoC) in the host 600. The memory controller 200 may be embodied on a motherboard and may also be embodied as an integrated memory controller (IMC) included in a microprocessor. Also, the memory controller 200 may be located in an input and output hub, and the input and output hub including the memory controller 200 may be referred to as a memory controller hub (MCH).

The memory controller 200 may include an ECC cache 220 so that ECC data is temporarily stored reducing overhead due to performing ECC operations. The memory controller 200 may include an ECC region manager 240 to manage the memory devices 420_1 to 420_k. Descriptions of the ECC cache 220 and the ECC region manager 240 will be provided with reference to a drawing below.

The memory controller 200 may include an ECC engine 260 to perform an ECC operation. The ECC operation may include an error detection operation and an error correction operation. The ECC engine 260 may include an ECC encoder that generates ECC data of write data in a data write mode and an ECC decoder that performs an error correction operation in a data read mode. The ECC may include, but is not limited to, parity, cyclical redundancy code (CRC), checksum, and/or hamming code.

The BUS2 may include a data bus, and the BUS3 may include various buses such as a control bus, and/or a command/address bus. The memory controller 200 may transmit to and receive from the memory module 400 a command/address signal CMD/ADDR, a control signal CTRL, data DQ, and a data strobe signal DQS through the BUS2 and the BUS3. The memory controller 200 may control a read of the data DQ from the memory module 400 and a write of the data DQ to the memory module 400. The memory controller 200 may provide the command/address signal CMD/ADDR and the control signal CTRL to the memory module 400; and may control to transmit to and receive from a memory device, of the memory devices 420_1 to 420_k, to be accessed the data DQ based on the control signal CTRL in a write or read mode set according to the command/address signal CMD/ADDR.

The host 600 may transmit data and input information to the memory system 100. For example, the host 600 may output various input information such as a read request, a write request, and/or an erase request to the memory system 100. The host 600 may be embodied as the memory controller 200 and/or a system on chip (SoC) including a central processing unit (CPU) or a graphics processing unit (GPU). The input information may include a command, address, priority information, and/or the like. The host 600 and the memory controller 200 may transmit various data and input information through the BUS1 to each other and the type of input information is not limited to the above examples. For example, the host 600 and the memory controller 200 may exchange data based on at least one of various interface protocols such as a universal serial bus (USB) protocol, a multimedia card (MMC) protocol, a serial-ATA protocol, a parallel-ATA protocol, a small computer small interface (SCSI) protocol, an enhanced small disk interface (ESDI) protocol, and an IDE protocol.

The host 600 may transmit a region decision control signal RDCS to the memory controller 200 in order to distinguish an ECC enable region. In addition, the host 600 may determine whether the data is to undergo an ECC operation depending on the type of the data and may assign an address where the data is stored based on the result of the determination. Detailed descriptions thereof will be provided below with reference to the drawings.

Figure 2:
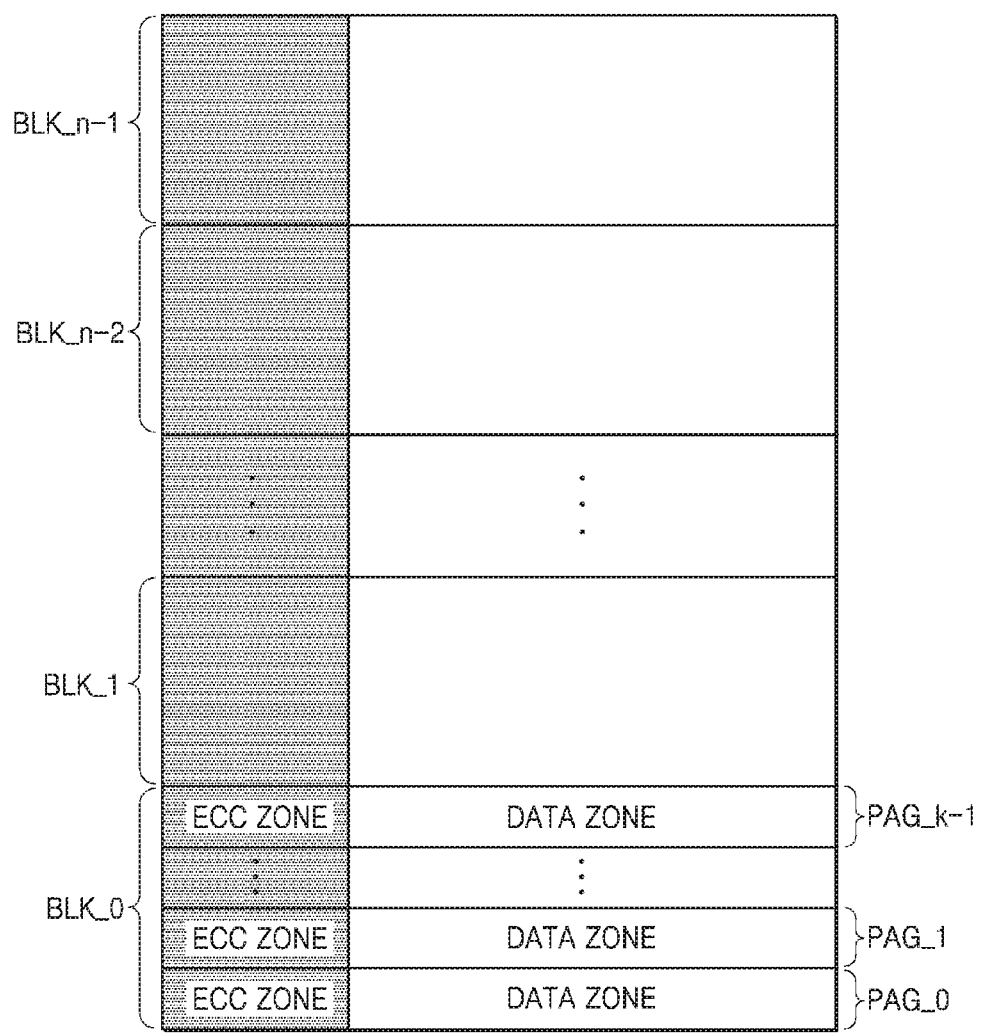
FIG. 2 illustrates a memory device according to an example embodiment of inventive concepts.

FIG. 2 illustrates a memory device 420 according to an example embodiment of inventive concepts.

The memory device 420 may include a plurality of memory banks, and a memory bank may include memory blocks. For example, the memory device 420 may include a plurality of memory blocks BLK_0 to BLK_n-1 (n is a natural number). Each of the memory blocks BLK_0 to BLK_n-1 may include a plurality of memory pages PAG_0 to PAG_k-1 (k is a natural number). Each of the memory pages PAG_0 to PAG_k-1 may include memories accessed by one row address, and the memories may be included in one word line.

Referring to FIG. 2, normal data and its ECC data may be stored on the same memory page. A region where normal data is stored in each of the memory pages PAG_0 to PAG_k-1 may be referred to as a data zone, and a region where ECC data is stored in each of the memory pages PAG_0 to PAG_k-1 may be referred to as an ECC zone. For example, each of the memory pages PAG_0 to PAG_k-1 may include the ECC zone and the data zone. A memory device in which normal data and ECC data are stored in the same page may be referred to as an in-line ECC memory device.

When a memory controller reads or writes data from or to the memory device 420, performing an operation of activating a row where there is data is done. Since a data zone where normal data is stored and an ECC zone where ECC data is stored are on the same memory page, the memory controller may read both normal data and ECC data from the memory device 420 through one activation operation.

The ratio of the capacity of an ECC zone to the capacity of a data zone in each of the memory pages PAG_0 to PAG_k-1 may vary depending on the characteristics of ECC data used. When the 64/72 hamming code is used as ECC, ECC data of 8 bits is included for each piece of normal data of 64 bits and thus, the ratio of the capacity of an ECC zone to the capacity of a data zone may be 1:8. However, the type of ECC and the ratio of the capacity of an ECC zone to the capacity of a data zone are not limited thereto. For example, in the case of 1-bit error detection, ECC data of 8 bits is needed for each piece of normal data of 128 bits, and thus, the ratio of the capacity of ECC zone to the capacity of data zone may be 1:16.

Figure 3:
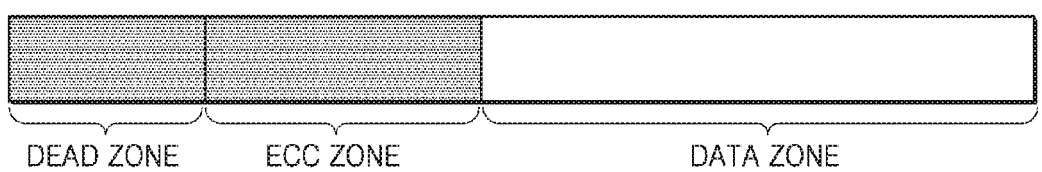
FIG. 3 illustrates a memory page according to an example embodiment of inventive concepts.

FIG. 3 illustrates a memory page according to an example embodiment of inventive concepts.

As described with reference to FIG. 2, a memory device may include a plurality of memory pages, and each memory page in an in-line ECC memory device may include an ECC zone where ECC data is stored and a data zone where normal data is stored. Referring to FIG. 3, a memory page may further include a dead zone that is a consumed region. For example, a memory page may include a dead zone, an ECC zone, and a data zone. The dead zone may be a waste zone that is inevitably generated in a process of adjusting the ratio of the capacity of the ECC zone to the capacity of the data zone.

As an example embodiment, assuming that a memory page has a capacity of 2 KB (2048 bytes) and an ECC is a 64/72 hamming code, constitutions of the memory page may be described. When an ECC is a 64/72 hamming code, ECC data of 8 bits is included for each piece of normal data of 64 bits and thus, 2 KB is divided in the ratio of 64:8 to form a data zone and an ECC zone. Therefore, the capacity occupied by a data zone may be 1792 bytes, and the capacity occupied by an ECC zone may be 224 bytes. Here, there may be an inevitably consumed region, and the capacity of a dead zone may be 32 bytes. As a result, in order to save ECC data, 256 bytes of 2 KB, which is occupied by the ECC zone and the dead zone, may be consumed.

In another example embodiment, assuming that a memory page has a capacity of 1 KB (1024 bytes), and an ECC is a 64/72 hamming code, constitutions of a memory page may be described. When an ECC is a 64/72 hamming code, ECC data of 8 bits is needed for each piece of normal data of 64 bits and thus, 1 KB is divided into 64:8 to form a data zone and an ECC zone. Thus, the capacity of a data zone may be 896 bytes, and the capacity of an ECC zone may be 112 bytes. Here, there may be an inevitably consumed region, and the capacity of a dead zone may be 16 bytes. As a result, in order to save ECC data, 128 bytes of 1 KB, which is occupied by the ECC zone and the dead zone, may be consumed.

However, inventive concepts are not limited to the two embodiments above, and configuration of a memory page may vary according to various methods described above depending on the type of an ECC used in a memory page.

Figure 4A:
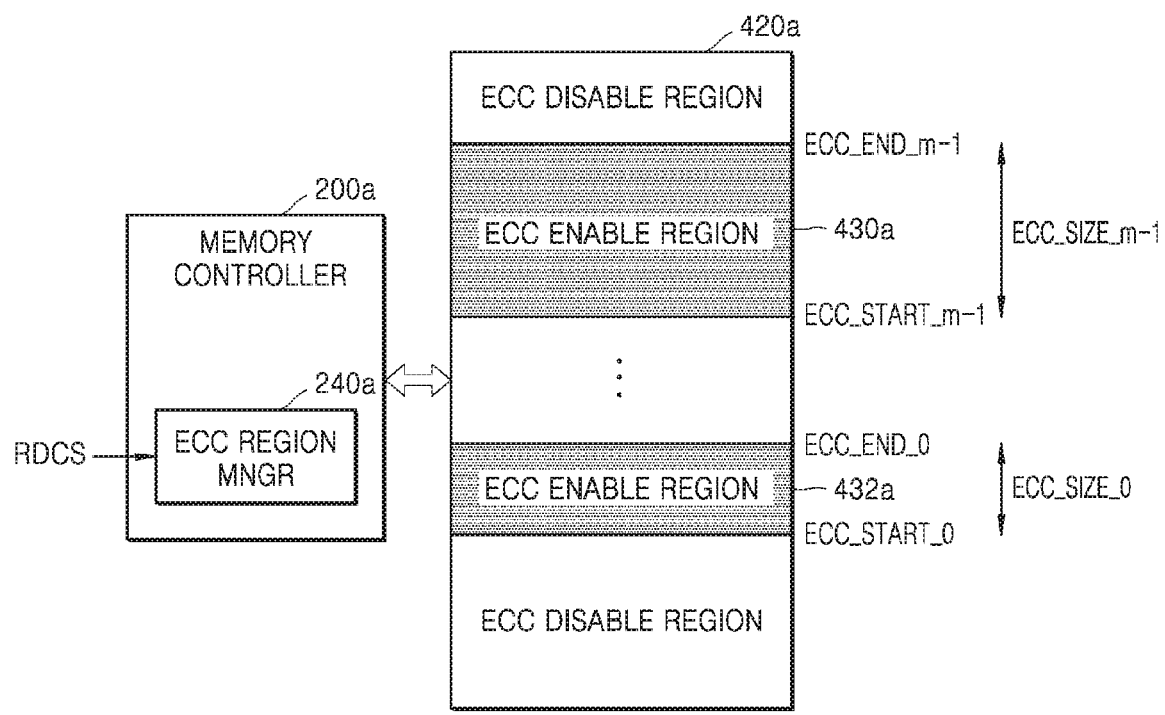
FIGS. 4A and 4B illustrate a memory controller and a memory device according to an example embodiment of inventive concepts.
Figure 4B:
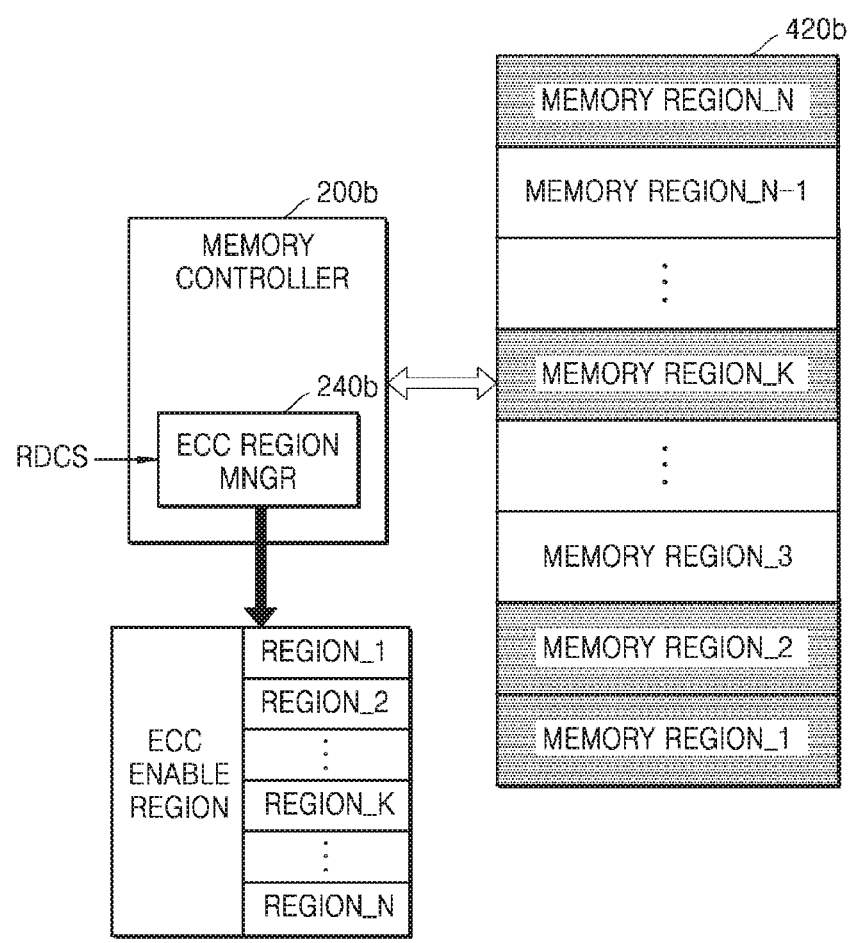

FIGS. 4A and 4B illustrate memory controllers 200a and 200b and memory devices 420a and 420b according to an exemplary embodiment.

The memory controllers 200a and 200b may control the memory devices 420a and 420b including a plurality of memory pages. The memory controllers 200a and 200b may control the plurality of memory devices 420a and 420b, but for the sake of convenience, the memory controllers 200a and 200b respectively will be described as operating the memory devices 420a and 420b.

The memory controllers 200a and 200b may respectively include ECC region managers 240a and 240b. The ECC region managers 240a and 240b may manage a plurality of memory pages of the memory devices 420a and 420b by dividing them into an ECC enable region and an ECC disable region. Memory pages included in the ECC enable region may be referred to as an ECC memory page. As described with reference to FIGS. 2 and 3, both normal data and ECC data may be stored in the ECC memory page. For example, the ECC memory page may include a data zone where normal data is stored, an ECC zone where ECC data is stored, and a dead zone to be consumed. Meanwhile, memory pages included in the ECC disable region are regions where ECC data is not required to be saved and thus, may only save normal data.

The ECC region managers 240a and 240b may receive a region decision control signal RDCS for identifying the ECC enable region from the outside of the memory controllers 200a and 200b, for example, a host. The region decision control signal RDCS may include information indicating which memory regions included in the memory devices 420a and 420b are allocated to an ECC enable region. The ECC region managers 240a and 240b may manage each of the memory devices 420a and 420b by dividing each of the memory devices 420a and 420b into an ECC enable region and an ECC disable region, based on the region decision control signal RDCS. Accordingly, information on the ECC enable region in the memory devices 420a and 420b may be stored as region data.

Referring to FIG. 4A, region data may include address information of an ECC enable region. For example, region data may include a row address of a memory page where an ECC enable region starts and a row address of a memory page where the ECC enable region ends. Here, m ECC enable regions (m is a natural number) are assumed to be managed by the ECC region manager 240a in the memory device 420a. The ECC region manager 240a may store ECC_START_0, which is a row address of a memory page where a first ECC enable region 432a starts, and ECC_END_0, which is a row address of a memory page where the first ECC enable region 432a ends. In addition, the ECC region manager 240a may store ECC_START_m−1, which is a row address of a memory page where an mth ECC enable region 430a starts, and ECC_END_m−1, which is a row address of a memory page where the mth ECC enable region 430a ends. The ECC region manager 240a may identify an ECC enable region and an ECC disable region of the memory device 420a based on information about the stored row addresses of ECC enable regions.

The method in which region data stores address information about an ECC enable region is not limited thereto. As another example, region data may store a row address of a memory page where an ECC enable region starts and a size of the ECC enable region. The ECC region manager 240a may store ECC_START_0, which is a row address of a memory page where the first ECC enable region 432a starts, and ECC_SIZE_0, which is a size of the first ECC enable region 432a. In addition, the ECC region manager 240a may store ECC_START_m−1, which is a row address of a memory page where the mth ECC enable region 430a starts, and ECC_SIZE_m−1, which is a size of the mth ECC enable region 430a. As another example, region data may store a row address of a memory page where an ECC enable region ends and a size of the ECC enable region.

Referring to FIG. 4B, the ECC region manager 240b may divide the memory device 420b into first to Nth memory regions MEMORY REGION_1~MEMORY REGION_N so that a plurality of memory pages of the memory device 420b may be managed by dividing them into an ECC enable region and an ECC disable region (N is a natural number). Each memory region may include a plurality of memory pages. Region data may include information indicating whether each memory region is an ECC enable region or an ECC disable region.

Region data is described assuming that the first memory region, the second memory region, the Kth memory region, the Nth memory region, etc. of the memory regions are included in an ECC enable region. Region data may include a table showing memory regions included in an ECC enable region, from among the memory regions. Although not illustrated, the ECC region manager 240b may store a table and address information of each memory region.

The method in which region data stores information on an ECC enable region is not limited thereto. As another example, region data may include a table showing memory regions included in an ECC disable region from among the memory regions.

Some capacities of an ECC memory page included in an ECC enable region are used as an ECC zone and a dead zone and thus, there may be no or reduced waste of capacity. As described with reference to FIGS. 4A and 4B, some regions of the memory devices 420a and 420b, in which data that does not require an ECC operation is stored, are identified as an ECC disable region and thus, capacity waste is prevented or reduced, and accordingly cost may be reduced.

Figure 5:
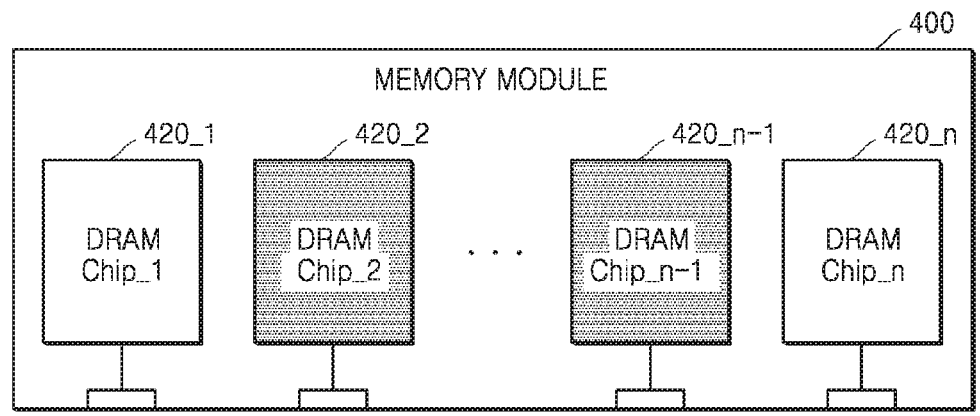
FIG. 5 illustrates a memory module according to an example embodiment of inventive concepts.

FIG. 5 illustrates the memory module 400 according to an example embodiment of inventive concepts.

The memory module 400 may include a plurality of memory devices, and the plurality of memory devices may be or may include a DRAM Chip_1 420_1 to an DRAM Chip_n 420_n (n is a natural number). The memory module 400 may not have a separate memory device for storing ECC data, and the memory module 400 may be an in-band ECC module storing normal data and ECC data on the same memory device. Each of the DRAM Chip_1 420_1 to the DRAM Chip_n 420_n may store both normal data and ECC data. Also, each of the DRAM Chip_1 420_1 to the DRAM Chip_n 420_n may be an in-line ECC memory device in which normal data and ECC data are stored in a memory page. A memory page included in each of the DRAM Chip 420_1 420_1 to the DRAM Chip_n 420_n may include a data zone and an ECC zone, and may further include a dead zone.

As described with reference to FIG. 4, each of the DRAM Chip_1 420_1 to the DRAM Chip_n 420_n may be divided into a plurality of memory regions by a memory controller, and an ECC region manager of the memory controller may manage memory regions of each of the DRAM Chip_1 420_1 to the DRAM Chip_n 420_n by dividing them into at least an ECC enable region and an ECC disable region. Referring to FIG. 5, each of the DRAM Chip_1 420_1 to the DRAM Chip_n 420_n included in the memory module 400 may be divided into an ECC enable region and an ECC disable region in a chip unit. For example, the DRAM Chip_1 420_1 and the DRAM Chip_n 420_n may all be categorized as an ECC disable region, and data that does not require an ECC operation may be stored in the DRAM Chip_1 420_1 and the DRAM Chip_n 420_n. Thus, the DRAM Chip_1 420_1 and the DRAM Chip_n 420_n may store only normal data. A memory device that is categorized into an ECC enable region as a whole may be referred to as a full-ECC memory device. In addition, for example, the DRAM Chip_2 420_2 and the DRAM Chip_n-1 420_n-1 may be all categorized as an ECC enable region, and the DRAM Chip_2 420_2 and the DRAM Chip_n-1 420_n-1 may store data that requires an ECC operation. Thus, the DRAM Chip_2 420_2 and the DRAM Chip_n-1 420_n-1 may store normal data and ECC data. A memory page included in a memory chip in which all memory pages, for example, the DRAM Chip_2 420_2 and the DRAM Chip_n-1 420_n-1, are set as an ECC enable region may include a data zone and an ECC zone, and may further include a dead zone. A memory device that is categorized into an ECC disable region as a whole may be referred to as a full-non ECC memory device.

Figure 6:
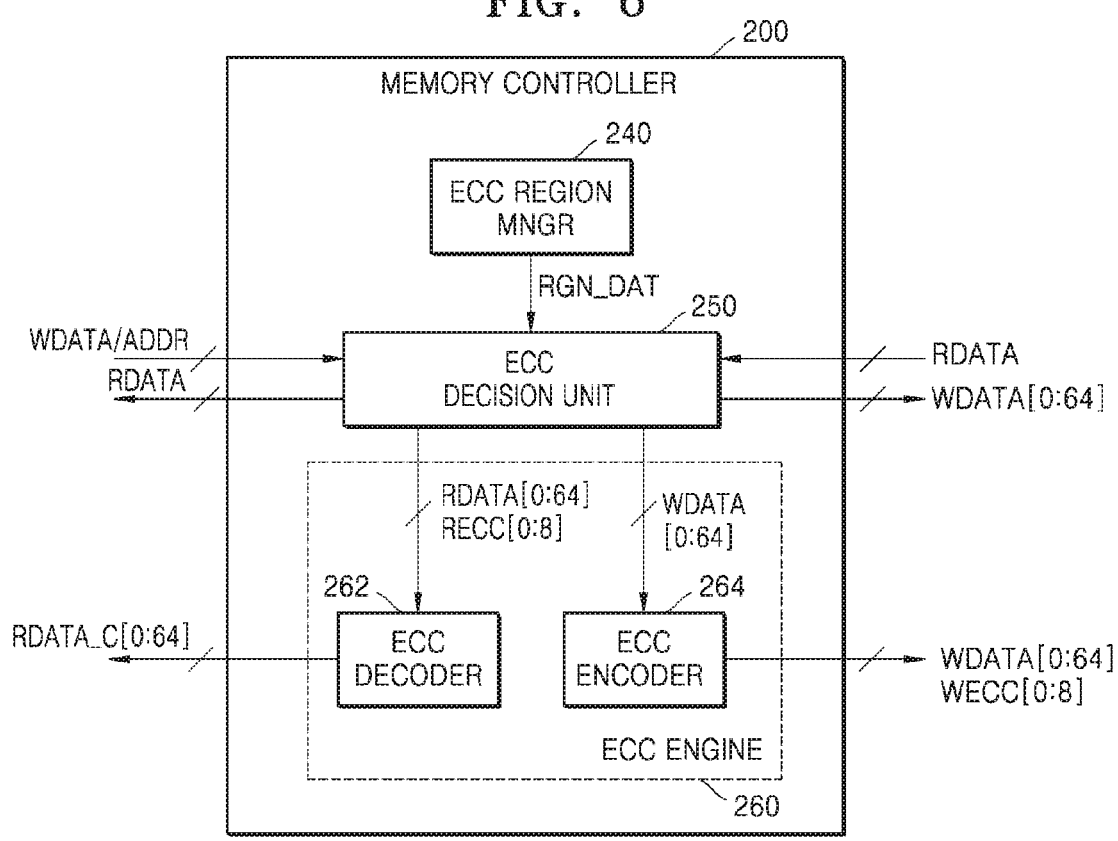
FIG. 6 illustrates a memory controller according to an example embodiment of inventive concepts.

FIG. 6 illustrates the memory controller 200 according to an example embodiment of inventive concepts.

The memory controller 200 may include the ECC region manager 240, an ECC decider or ECC decision unit 250, and the ECC engine 260.

The ECC region manager 240 may manage a plurality of memory pages of a memory device by dividing them into an ECC enable region and an ECC disable region. The ECC region manager 240 may store region data RGN_DAT to divide a memory page into an ECC enable region and an ECC disable region. In addition, the ECC region manager 240 may transmit the region data RGN_DAT to the ECC decision unit 250. Detailed descriptions of the ECC region manager 240 and the region data. RGN_DAT are provided with reference to FIGS. 4A and 4B.

The ECC decision unit 250 may determine whether an ECC operation is to be performed on data input to the memory controller 200. The ECC decision unit 250 may receive the region data RGN_DAT from the ECC region manager 240 and determine the type of input data based on the region data RGN_DAT.

In a data write mode, the memory controller 200 may receive an address ADDR where write data WDATA and write data are to be stored from a host. The ECC decision unit 250 may receive the write data WDATA and the address ADDR. The ECC decision unit 250 may compare the address ADDR of write data with the region data RGN_DAT received from the ECC region manager 240 and then determine whether an ECC operation of the write data WDATA is performed. As a result of the comparison, when the address ADDR of the write data WDATA is included in an ECC enable region of a memory device, the ECC decision unit 250 may determine that an ECC operation is to be performed on the write data WDATA. However, when the address ADDR of the write data WDATA is included in an ECC disable region, the ECC decision unit 250 may determine that the write data WDATA does not require an ECC operation.

In a data read mode, the memory controller 200 may receive an address ADDR where data is stored from a host and may receive read data RDATA from a memory device. The ECC decision unit 250 may compare the address ADDR of read data with the region data RGN_DAT received from the ECC region manager 240 and then may determine whether an ECC operation of the read data RDATA is to be performed. As a result of the comparison, when the address ADDR of the read data RDATA is included in an ECC enable region of a memory device, the ECC decision unit 250 may determine that an ECC operation is to be performed the read data RDATA. However, when the address ADDR of the read data RDATA is included in an ECC disable region of a memory device, the ECC decision unit 250 may determine that the read data RDATA does not require an ECC operation. When read data requires an ECC operation, the ECC decision unit 250 may receive ECC data RECC as well as the read data to transmit them to the ECC engine 260.

The ECC engine 260 may perform ECC encoding in a data write mode, and may perform ECC decoding in a data read mode. To this end, the ECC engine 260 may include an ECC encoder 264 and an ECC decoder 262.

The ECC encoder 264 may receive the write data WDATA that requires an ECC operation from the ECC decision unit 250. The ECC encoder 264 may perform ECC encoding on the write data WDATA. The ECC encoder 264 may generate ECC data WECC[0:8] for correcting an error of the write data WDATA of 64 bits. For example, the ECC encoder 264 may generate a hamming code of 8 bits with respect to write data WDATA[0:64] input in a 64-bits unit. The ECC encoder 264 may transmit the write data WDATA and the ECC data WECC[0:8] to a memory device. Although a 64/72 hamming code is described as being used, inventive concepts are not limited thereto. An ECC including a parity or a cyclical redundancy code (CRC) may also be used.

The ECC decoder 262 may receive from the ECC decision unit 250 the read data RDATA that requires an ECC operation and the ECC data RECC of the read data RDATA. The ECC decoder 262 may perform ECC decoding on the read data RDATA. For example, the ECC decoder 262 may perform an error correction function. For example, the ECC decoder 262 may perform a data correction function by using read data RDATA[0:64] input in a 64-bits unit and a hamming code RECC[0:8] of 8 bits. The ECC decoder 262 may transmit corrected read data RDATA_C to a memory device. Although a 64/72 hamming code is described as being used, inventive concepts are not limited thereto. An ECC including a parity or a CRC may also be used.

As described above, the memory controller 200 may include the ECC region manager 240 and the ECC decision unit 250 and thus determine characteristics of the write data WDATA and the read data RDATA that are input. Only when the input data requires an ECC operation, such ECC operation is performed, thus reducing overhead due to ECC.

Figure 7:
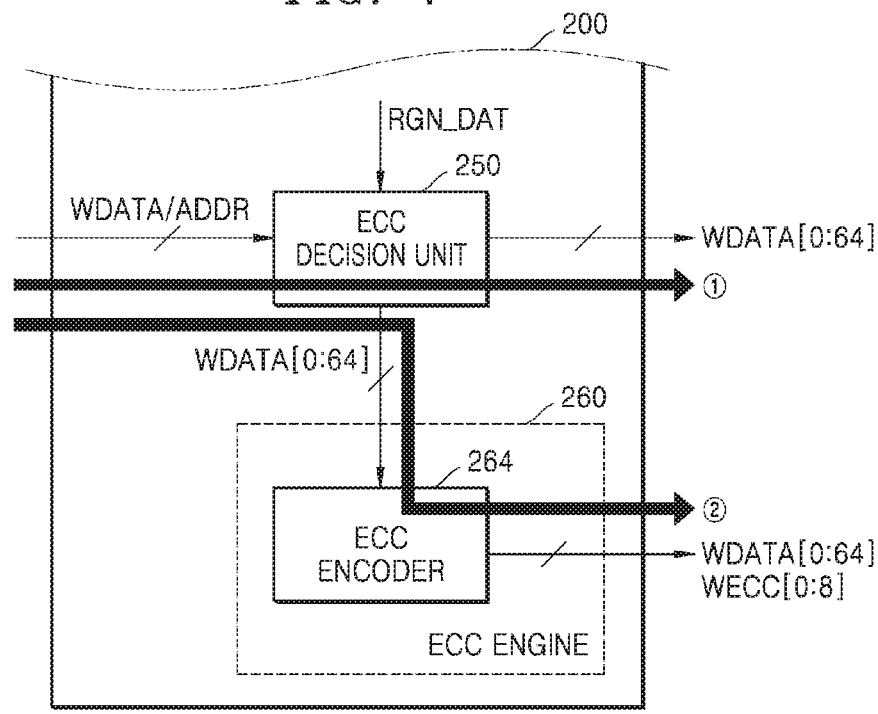
FIG. 7 illustrates a memory controller according to an example embodiment of inventive concepts.

FIG. 7 illustrates the memory controller 200 according to an example embodiment of inventive concepts.

In a data write mode, the memory controller 200 may receive write data WDATA and an address ADDR where write data WDATA is to be stored from outside of the memory controller 200, for example, a host. The ECC decision unit 250 included in the memory controller 200 may receive the write data WDATA and the address ADDR. The ECC decision unit 250 may receive region data RGN_DAT from an ECC region manager. The ECC decision unit 250 may compare the region data RGN_DAT with the address ADDR to determine whether an ECC operation of the write data WDATA is performed.

After comparing the address ADDR where the write data WDATA is to be stored with the region data RGN_DAT, when the address ADDR is included in an ECC disable region, the write data WDATA may be input to a memory device through a path ①. In other words, when the address ADDR is included in an ECC disable region, the ECC decision unit 250 may determine that the write data WDATA does not require an ECC operation and may not perform ECC encoding on the write data WDATA to transmit the write data WDATA to a memory device.

After comparing the address ADDR where the write data WDATA is to be stored with the region data RGN_DAT, when the address ADDR is included in an ECC enable region, the write data WDATA may be input to a memory device through a path ②. In other words, when the address ADDR is included in an ECC enable region, the ECC decision unit 250 may determine that the write data WDATA requires an ECC operation and may transmit the write data WDATA to the ECC encoder 264 of the ECC engine 260. The ECC encoder 264 may perform ECC encoding on the write data WDATA. For example, the ECC encoder 264 may generate a hamming code of 8 bits with respect to write data WDATA[0:64] that is input in a 64-bits unit. For example, the ECC encoder 264 may generate ECC data WECC[0:8] for correcting an error of the write data WDATA of 64 bits. The ECC encoder 264 may transmit the write data WDATA and the ECC data WECC[0:8] to a memory device. Although a 64/72 hamming code is described as being used in an example embodiment, inventive concepts are not limited thereto and may use an ECC such as parity and CRC.

Figure 8:
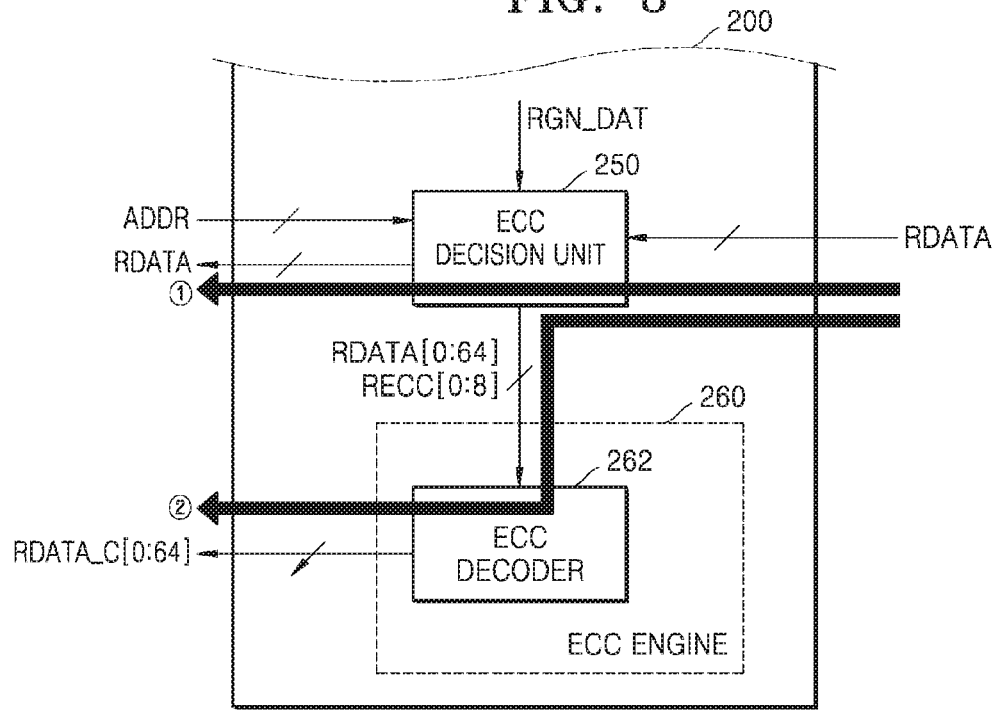
FIG. 8 illustrates a memory controller according to an example embodiment of inventive concepts.

FIG. 8 illustrates the memory controller 200 according to an example embodiment of inventive concepts.

In a data read mode, the memory controller 200 may receive an address ADDR where read data RDATA is stored from a host and may receive the read data RDATA from a memory device. The ECC decision unit 250 included in the memory controller 200 may receive the read data. RDATA and the address ADDR. The ECC decision unit 250 may receive region data RGN_DAT from an ECC region manager. The ECC decision unit 250 may compare the region data RGN_DAT with the address ADDR to determine whether an ECC operation of the read data RDATA is performed.

After comparing the address ADDR where the read data RDATA is to be stored with the region data RGN_DAT, when the address ADDR is included in an ECC disable region, the read data RDATA may be input to a host through a path ①. In other words, when the address ADDR is included in an ECC disable region, the ECC decision unit 250 may determine that the read data RDATA does not require an ECC operation and may not perform ECC decoding on the read data RDATA to transmit the read data RDATA to the host.

After comparing the address ADDR where the read data RDATA is stored with the region data RGN_DAT, when the address ADDR is included in an ECC enable region, the read data RDATA may be input to a host through a path ②. In other words, when the address ADDR is included in an ECC enable region, the ECC decision unit 250 may determine that the read data RDATA requires an ECC operation and may transmit the read data RDATA to the ECC decoder 262 of the ECC engine 260. The ECC decoder 262 may perform ECC decoding on the received read data RDATA. In other words, the ECC decoder 262 may perform an error correction function. For example, the ECC decoder 262 may perform a data correction function by using read data RDATA[0:64] that is input in a 64-bit unit and a hamming code RECC[0:8] of 8 bits. The ECC decoder 262 may transmit corrected read data RDATA_C to a host. Although a 64/72 hamming code is described as being used in an example embodiment, inventive concepts are not limited thereto and may use an ECC such as parity or CRC.

Figure 9:
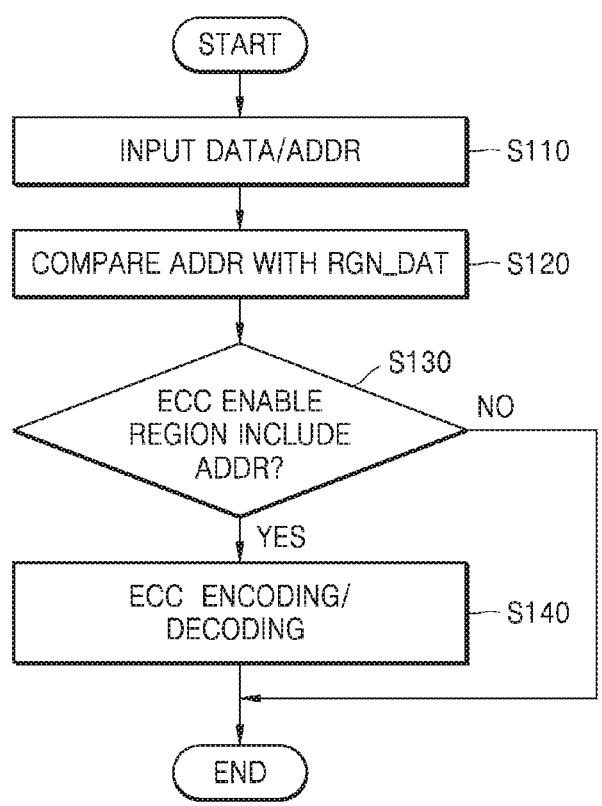
FIG. 9 illustrates an operation flowchart of a memory controller according to an example embodiment of inventive concepts.

FIG. 9 illustrates an operation flowchart of a memory controller according to an example embodiment of inventive concepts.

A memory controller may receive an address ADDR from a host and may receive data DATA from a host in a data write mode or from a memory device in a data read mode. For example, the data DATA and the address ADDR may be input from outside to the memory controller (S110). Referring to FIG. 6, the input data DATA and the address ADDR may be transmitted to the ECC decision unit 250, and the ECC decision unit 250 may compare the address ADDR with the region data RGN_DAT received from the ECC region manager 240 (S120). The ECC decision unit 250 may determine whether the address ADDR indicating a location where data is stored is included in an ECC enable region (S130). If the address ADDR is not included in an ECC enable region, the ECC decision unit 250 may determine that the data does not require an ECC operation, e.g. an ECC operation is not justified, and may not transmit the data to an ECC engine. If the address ADDR is included in an ECC enable region, the ECC decision unit 250 may determine that the data requires an ECC operation and may transmit the data to an ECC engine. The ECC engine may perform an ECC operation (ECC encoding or ECC decoding) on the transmitted data (S140).

As described above, the memory controller performed ECC operation only on data stored or to be stored in an ECC enable region, and thus an overhead due to ECC may be reduced.

Figure 10:
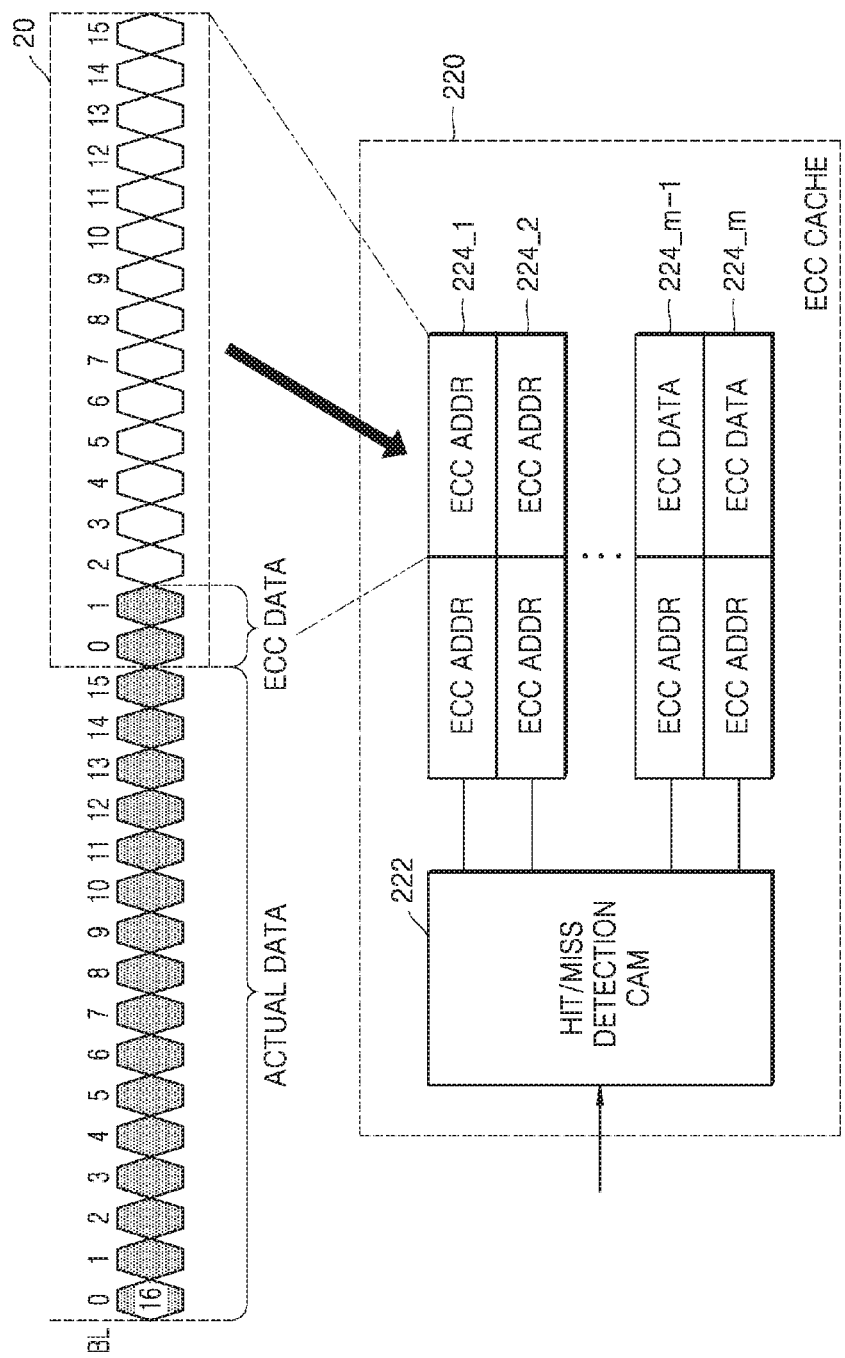
FIG. 10 illustrates an ECC cache according to an example embodiment of inventive concepts.

FIG. 10 illustrates the ECC cache 220 according to an example embodiment of inventive concepts.

A memory controller may include the ECC cache 220 for temporarily storing ECC data, the ECC cache 220 may include a hit/miss detection cam HIT/MISS DETECTION CAM 222, an ECC address ECC ADDR, and a plurality of memories 224_1 to 224_m. (m is a natural number) for storing ECC data. In order to describe an operation of the ECC cache 220, a method in which data is read from a memory device is first described. The ECC cache 220 may temporarily store the ECC data, such that the ECC data is easily accessible.

The memory controller may receive data from a memory device through a burst operation. The burst operation may refer to an operation that simultaneously reads or writes data by sequentially reducing or increasing an address from an initial address. A basic unit of the burst operation may be a burst length BL. Referring to FIG. 10, the burst length BL may be 16. A burst length may include 16 bits, that is, data of 2 bytes. When the aforementioned burst operation is performed, data of 32 bytes may be read, e.g. simultaneously read from a memory device through one single read operation. Hereinafter, the burst length is described as 16 but the burst length is not limited thereto. For example, the burst length may be 2, 4, 8, or 32, and when the burst length is 32, data of 64 bytes may be simultaneously read from a memory device through one single read operation.

When the burst length is 16, data of 32 bytes may be simultaneously read from a memory device through one single read operation. When normal data of 32 bytes, that is, actual data ACTUAL DATA is read from a memory page included in an ECC enable region of a memory device, ECC data ECC DATA may need to be sequentially read so as to perform ECC decoding. ECC data needed to perform ECC decoding on the actual data ACTUAL DATA of 32 bytes may be 4 bytes. However, since data of 32 bytes are simultaneously received through one single read operation, ECC data of actual data in the next address may be simultaneously read in the remaining 28 bytes. Thus, if ECC data in the next address is stored in a memory controller, the memory controller does not need to, or is not justified in, reading additional ECC data from a data device when reading actual data ACTUAL DATA corresponding to the next address.

Therefore, the ECC cache 220 may store the read ECC data in the plurality of memories 224_1 to 224_m with an ECC address ECC ADDR. The hit/miss detection content addressable memory (cam) 222 of the ECC cache 220 may detect whether there is a hit between an address of data to be read and an address stored in the ECC cache 220, according to a data read command of the memory controller. When ECC data of data to be read is stored in the plurality of memories 224_1 to 224_m of the ECC cache 220, a hit may occur. Here, the memory controller may not separately read ECC data and may perform ECC decoding by using ECC data stored in the ECC cache 220.

Figure 11:
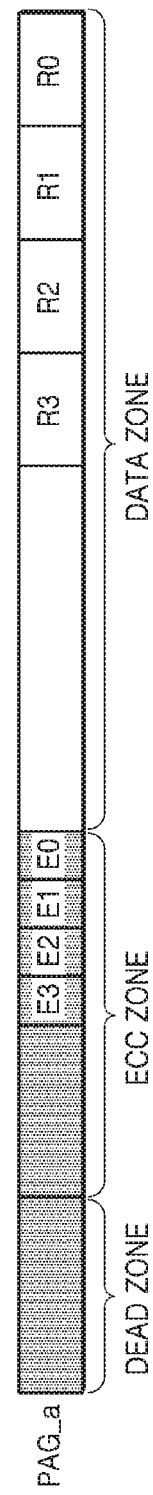
FIG. 11 illustrates a memory page included in an ECC enable region according to an example embodiment of inventive concepts.

FIG. 11 illustrates a memory page PAG_a included in an ECC enable region according to an example embodiment of inventive concepts.

The memory page PAG_a included in an ECC enable region may include an ECC zone and a data zone and may further include a dead zone. Normal data stored in the data zone may be divided into a plurality of memory sectors R0, R1, R2, R3 . . . in a 32-byte unit. When an ECC used a 64/72 hamming code, ECC data of normal data of 32 bytes may be 4 bytes. Thus, ECC data stored in an ECC zone may be divided into a plurality of ECC memory sectors E0, E1, E2, E3 . . . in a 4-byte unit. ECC data of normal data included in the first memory sector R0 may be stored in the first ECC memory sector E0, ECC data of normal data included in the second memory sector R1 may be stored in the second ECC memory sector E1, ECC data of normal data included in the third memory sector R2 may be stored in the third ECC memory sector E2, and/or ECC data of normal data included in the fourth memory sector R3 may be stored in the fourth ECC memory sector E3.

Figure 12:
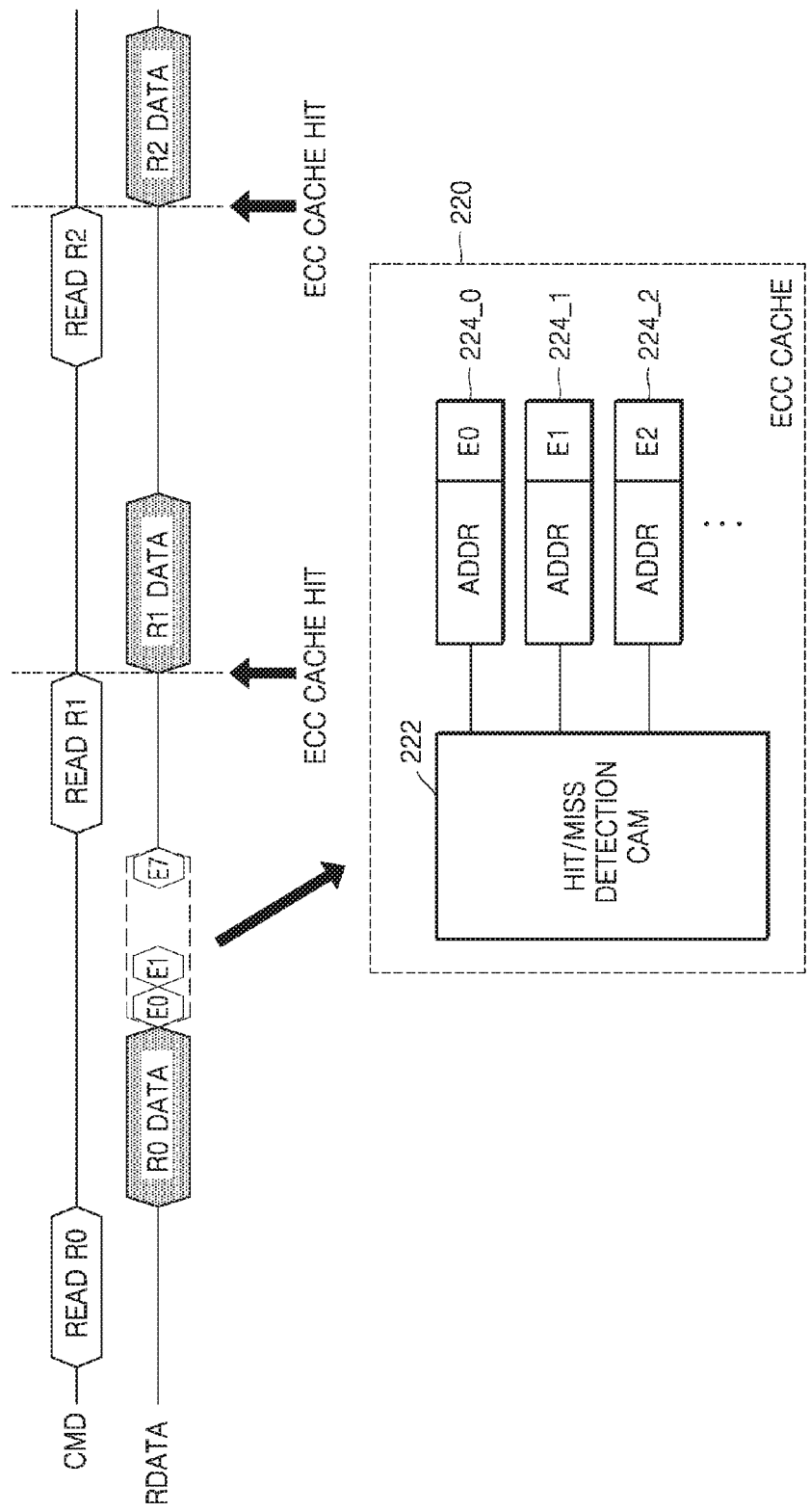
FIG. 12 illustrates a time flowchart of reading data from the memory page of FIG. 11.

FIG. 12 illustrates a time flowchart of reading data from the memory page PAG_a of FIG. 11.

Referring to FIGS. 11 and 12, according to an R0 read command READ R0, the memory controller may activate the memory page PAG_a including the first memory sector R0 and may read normal data R0 DATA included in the first memory sector R0 from the memory page PAG_a. Here, the memory page $PAG_{13}$ a including the first memory sector R0 is a memory page included in an ECC enable region, and thus, the memory controller may read ECC data included in the first ECC memory sector E0 from the memory page PAG_a. When a burst length is 16, the memory controller may read, e.g. simultaneously read, data of 32 bytes from a memory device and may also simultaneously read ECC data included in the second to eighth ECC memory sectors E1 to E7 of an adjacent address since data included in the first ECC memory sector E0 is 4 bytes. The read ECC data may be stored in the ECC cache 220 with address information.

Then, the memory controller may read normal data R1 DATA included in the second memory sector R1 from the memory page PAG_a, according to a R1 read command READ R1. Here, the hit/miss detection cam 222 of the ECC cache 220 may compare an address of the second memory sector R1 with an address stored therein and then detect whether a hit may occur with the stored address of the second ECC memory sector E1. Here, the occurred hit may be referred to as an ECC cache hit. When the ECC cache hit occurs, the ECC data is stored in the ECC cache 220, and thus, the memory controller may not read ECC data included in the second ECC memory sector E1 from a memory device.

In this regard, the memory controller may not read normal data R2 DATA included in the third memory sector R2 from the memory page PAG_a, according to a R2 read command READ R2. Here, ECC data included in the third ECC memory sector E2 is stored in the ECC cache 220, and thus, the hit/miss detection cam 222 may detect an ECC cache hit. Therefore, the memory controller may not read ECC data included in the third ECC memory sector E2 from a memory device.

Figure 13:
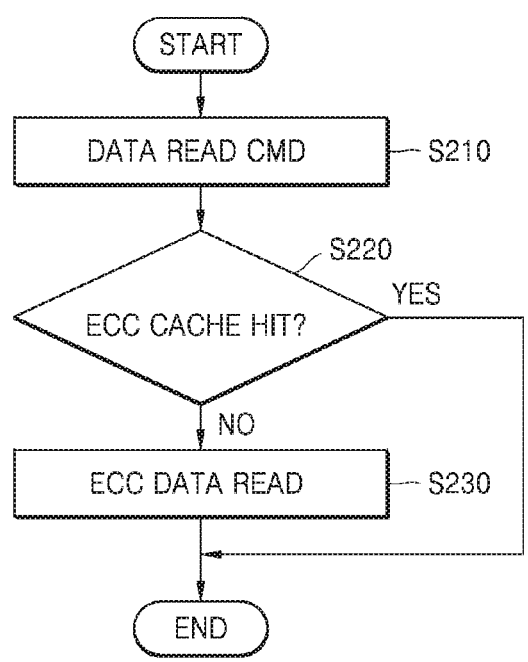
FIG. 13 illustrates an operation flowchart of an ECC cache according to an example embodiment of inventive concepts.

FIG. 13 illustrates an operation flowchart of an ECC cache according to an example embodiment of inventive concepts.

First, a data read command may be input to a memory controller (S210). Here, an ECC cache included in the memory controller may determine whether a cache hit occurs by comparing ECC address which indicates the address of ECC data stored therein with an address of read data. When there already is ECC data of data to be read in the ECC cache, it may be defined that an ECC cache hit occurs. In other words, the ECC cache may determine whether an ECC cache hit occurs (S220). If an ECC cache hit has occurred, ECC data of data to be read from a memory device is stored in the ECC cache, and thus, the ECC data may not be read from the memory device. If an ECC cache hit has not occurred (it may be called an ECC cache miss), the memory controller may read ECC data from the memory device (S230).

The memory controller reads ECC data from the memory device only when an ECC cache hit has not occurred, and thus, overhead due to ECC may be reduced.

Figure 14:
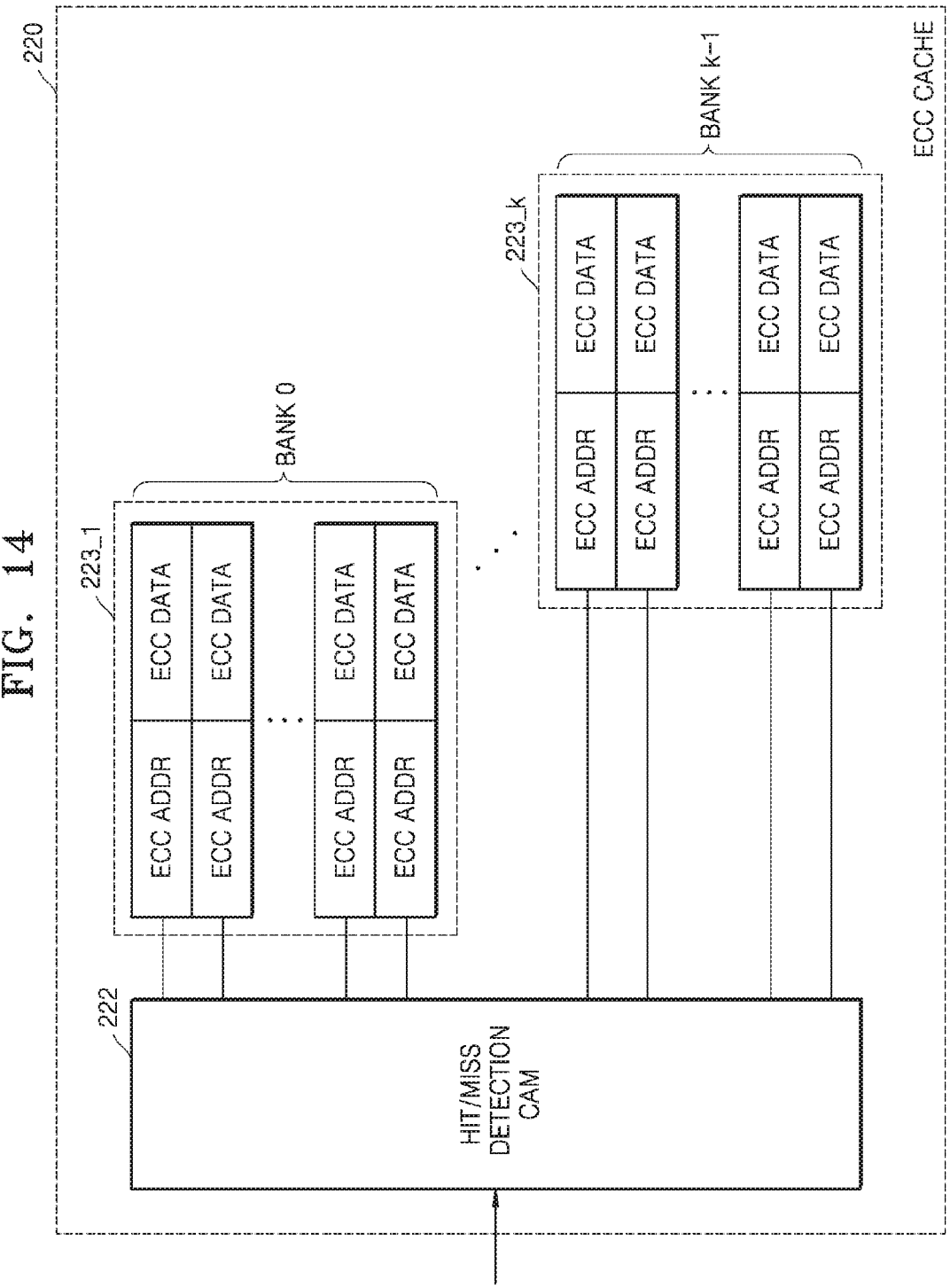
FIG. 14 illustrates an ECC cache according to an example embodiment of inventive concepts.

FIG. 14 illustrates the ECC cache 220 according to an example embodiment of inventive concepts.

The ECC cache 220 may include the hit/miss detection cam 222 and first to kth memories 223_1 to 223_k (k is a natural number) for storing address information and ECC data. The ECC cache 220 may store ECC data in different memories of each bank of a memory device. For example, ECC data stored in a memory page included in a first memory bank BANK 0 may be stored in the first memory 223_1, and ECC data stored in a memory page included in a kth memory bank BANK k−1 may be stored in the kth memory 223_k.

The ECC cache 220 stores ECC data in different memories of each memory bank, and thus, the time the hit/miss detection cam 222 of the ECC cache 220 takes to detect an ECC cache hit may be reduced.

Figure 15:
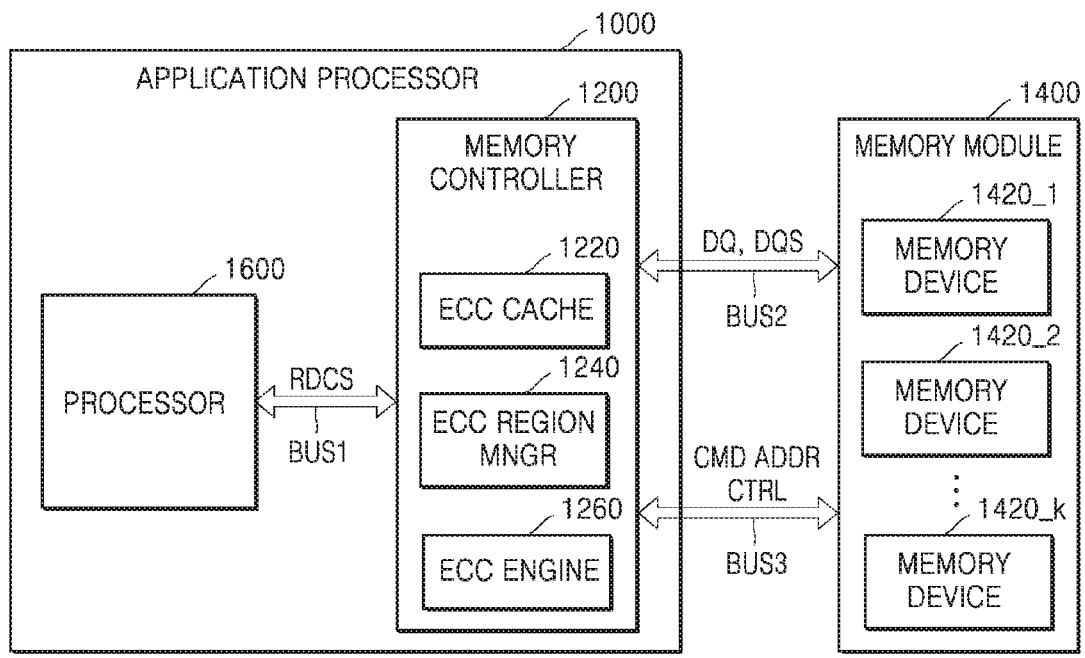
FIG. 15 illustrates an application processor transmitting and receiving data to and from an external memory module according to an example embodiment of inventive concepts.

FIG. 15 illustrates an application processor 1000 transmitting and receiving data to and from an memory module according to an example embodiment of inventive concepts.

The application processor 1000 may include a processor 1600 and a memory controller 1200. It is understood that the description of the electronic system provided with reference to FIG. 1 is applied to the application processor 1000 and a memory module 1400.

The memory module 1400 may temporarily store data processed or to be processed by the processor 1600. The memory module 400 may include one or more memory ranks and may store ECC data. The memory module 1400 may be an in-band ECC memory module without a separate memory chip for ECC, and at least one of memory devices 1420_1 to 1420_k (k is a natural number) may store normal data and ECC data. In particular, the memory devices 1420_1 to 1420_k (may be in-line memory devices storing normal data and ECC data on the same memory page. A memory page included in the memory devices 1420_1 to 1420_k may include a data zone for storing normal data and an ECC zone for storing ECC data, and may also include a dead zone, which is the consumed area. Descriptions of the memory device of FIGS. 2 and 3 may be applied to the memory devices 1420_1 to 1420_k in the memory module 1400.

The memory controller 1200 may include an ECC cache 1220 for temporarily storing ECC data and an ECC region manager 1240 for managing memory pages included in the memory devices 1420_1 to 1420_k by dividing them into an ECC enable region and an ECC disable region. The ECC region manager 1240 may store as region data information that divides the memory pages included in the memory devices 1420_1 to 1420_k into ECC enable regions and ECC disable regions. An ECC decision unit (not shown) in the memory controller 1200 may receive the region data from the ECC region manager 1240 and determine whether ECC operation of data input from the memory controller 1200 is performed. The memory controller 1200 may include an ECC engine 1260 in order to perform ECC encoding or ECC decoding on data requiring an ECC operation. The ECC engine 1260 may include an ECC encoder and an ECC decoder. It may be understood that detailed descriptions of the memory controller 1200 are the same as those provided with reference to FIGS. 6 to 13.

The processor 1600 may transmit data and input information to the memory system 100. The input information may be at least one of various information such as a read request, a write request, and an erase request. The input information may include a command, address, and priority information. The processor 1600 may transmit a region decision control signal RDCS to the memory controller 1200 to identify an ECC enable region.

The processor 1600 may determine whether to execute an ECC operation on data to be stored in the memory module 1400. For example, in the case of metadata or system data whose error caused by the data loss is fatal, such data may require an ECC operation. In addition, for example, in the case of infotainment whose error caused by the data loss is not fatal, such data may not require an ECC operation. The processor 1600 may assign an address included in an ECC enable region to an address of data requiring an ECC operation and may assign an address included in an ECC disable region to an address of data that does not require an ECC operation.

Figure 16:
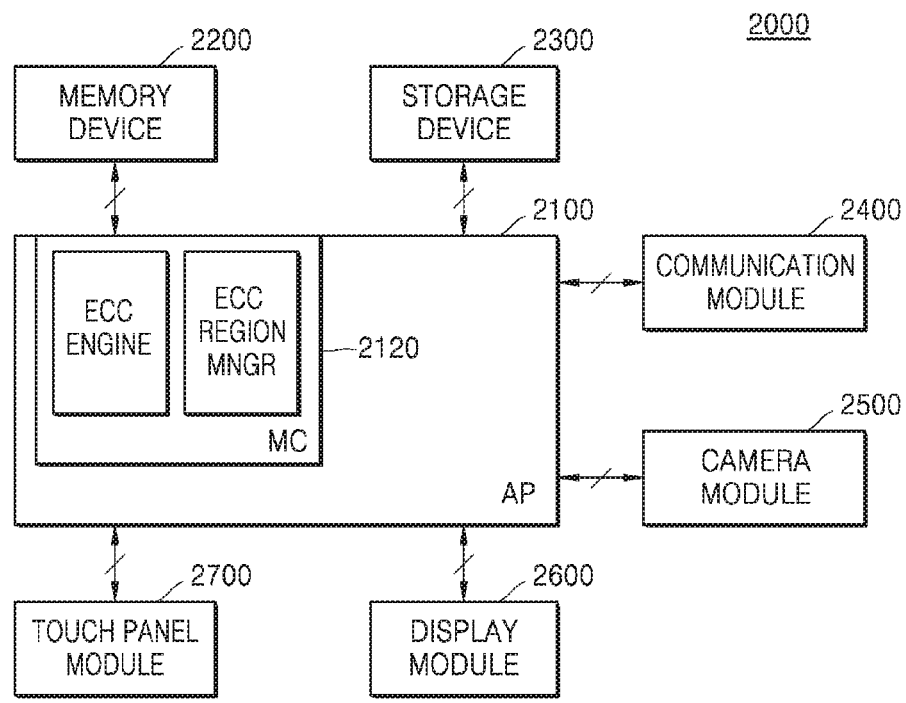
FIG. 16 illustrates a mobile system according to an example embodiment of inventive concepts.

FIG. 16 illustrates a mobile system 2000 according to an example embodiment of inventive concepts.

The mobile system 2000 may include an application processor 2100, a memory device 2200, a storage device 2300, and a plurality of function modules.

The application processor 2100 may control all operations of the mobile system 2000. In other words, the application processor 2100 may control the memory device 2200, the storage device 2300 and the plurality of function modules.

The memory device 2200 and the storage device 2300 may store data for an operation of the mobile system 2000. The memory device 2200 may include at least one of a volatile memory and a nonvolatile memory. The nonvolatile memory may include read only memory (ROM), programmable ROM (PROM), electrically programmable ROM (EPROM), electrically erasable and programmable ROM (EEPROM), a flash memory, PRAM, magnetic RAM (MRAM), RRAM, ferroelectric RAM (FRAM), and/or the like. The volatile memory may include at least one of various memories such as dynamic RAM (DRAM), SRAM, SDRAM, PRAM, MRAM, RRAM, and FRAM. The memory device 2200 may be an in-line ECC memory device storing ECC data and normal data on the same memory page. Detailed descriptions thereof may be understood with reference to FIGS. 2 and 3. The storage device 2300 may include a solid state drive (SSD), a hard disk drive (HHD), a CD-ROM, or the like.

The plurality of function modules may each perform various functions of the mobile system 2000. For example, the mobile system 2000 may include a communication module 2400 for performing a communication function, a camera module 2500 for performing a camera function, a display module 2600 for performing a display function, a touch panel module 2700 for performing a touch input function, and the like. However, the plurality of function modules included in the mobile system 2000 are not limited thereto. For example, the mobile system 2000 may further include a global positioning system (GPS) module, a microphone module, a speaker module, a gyroscope module, and/or the like.

The application processor 2100 may include a memory controller 2120. The memory controller 2120 may control the memory device 2200. The memory controller 2120 may include an ECC region manager ECC REGION MNGR for managing memory pages in the memory device 2200 by dividing them into an ECC enable region and an ECC disable region, an ECC engine ECC ENGINE, and an ECC cache for temporarily storing ECC data. Detailed descriptions of the memory controller 2120 controlling the memory device 2200 may be understood with reference to FIGS. 4A to 13.

As described above, the memory controller 2120 controls the memory device 2200 and includes an ECC cache, and thus, overhead due to ECC storage of an in-band ECC memory device may be reduced.

Figure 17:
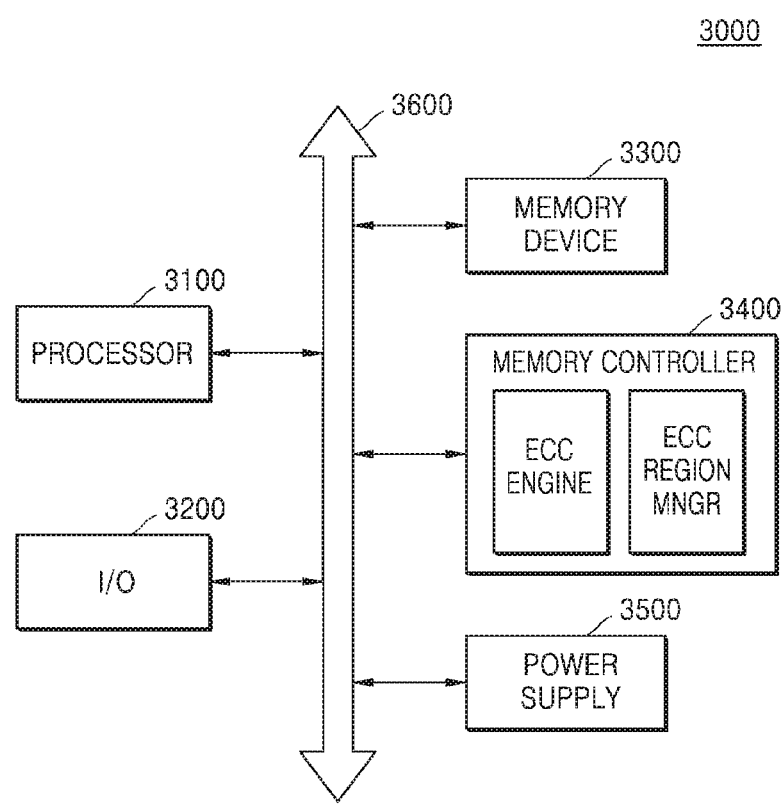
FIG. 17 illustrates a computing system according to an example embodiment of inventive concepts.

FIG. 17 illustrates a computing system 3000 according to an example embodiment of inventive concepts.

The computing system 3000 may include a processor 3100, an I/O device 3200, a memory device 3300, a memory controller 3400, and a power supply 3500. The computing system 3000 may communicate with video cards, sound cards, memory cards, USB devices, etc. and may further include ports for communicating with other electronic devices. The computing system 3000 may be embodied as a personal computer, or may be embodied as a portable electronic device such as a notebook computer, a mobile phone, a personal digital assistant (PDA) and a camera.

The processor 3100 may perform certain calculations or tasks. According to an example embodiment, the processor 3100 may be or may include a micro-processor or a central processing unit (CPU). The processor 3100 may communicate with the I/O device 3200, the memory device 3300 and the memory controller 3400 through a bus 3600 such as an address bus, a control bus, and/or a data bus.

The I/O device 3200 may include input means such as a keyboard, a keypad, or a mouse and output means such as a printer or a display. The power supply 3500 may supply the operation voltage required to operate the computing system 3000.

The memory device 3300 may store various data. The memory device 3300 may include at least one of a volatile memory and a nonvolatile memory. The nonvolatile memory may include ROM, PROM, EPROM, EEPROM, a flash memory, PRAM, MRAM, RRAM, FRAM, and the like. The volatile memory may include at least one of various memories such as DRAM, SRAM, SDRAM, PRAM, MRAM, RRAM, and a FRAM. The memory device 3300 may be or may include an in-line ECC memory device storing ECC data and normal data on the same memory page. Detailed descriptions thereof may be understood with reference to FIGS. 2 and 3.

The memory controller 3400 may control the memory device 3300. The memory controller 3400 may include an ECC region manager ECC REGION MNGR for managing memory pages in the memory device 3300 by dividing them into an ECC enable region and an ECC disable region, an ECC engine ECC ENGINE, and an ECC cache for temporarily storing ECC data. Detailed descriptions of the memory controller 3400 controlling the memory device 3300 may be understood with reference to FIGS. 4A to 13.

The memory device 3300 and the memory controller 3400 according to an embodiment of inventive concepts may be mounted by using various types of packages. For example, the memory device 3300 and the memory controller 3400 may be mounted by using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), system in package (SIP), multi-chip package (MCP), wafer-level fabricated package (WFP), and wafer-level processed stack package (WSP).

As described above, the memory controller 3400 controls the memory device 3300 and includes an ECC cache, and thus, overhead due to ECC storage by an in-band ECC memory device may be reduced.

While inventive concepts have been particularly shown and described with reference to embodiments thereof, it will be understood that various changes in form and details may be made therein without departing from the spirit and scope of the following claims.

What is claimed is:

1. A memory controller configured to control a memory device including a plurality of memory pages, the memory controller comprising:
    an error correction code (ECC) region manager configured to manage the plurality of memory pages by dividing the plurality of memory pages into ECC enable regions and ECC disable regions; and
    an ECC engine configured to perform an ECC operation on data included in the ECC enable regions, wherein,
    when data and data address are received from outside the memory controller and the ECC enable regions include the data address, the ECC engine performs the ECC operation on the received data, and
    when the ECC disable regions include the data address, the ECC engine does not perform the ECC operation on the received data.

2. The memory controller of claim 1, wherein the ECC region manager is configured to store information on the ECC enable regions as region data.

3. The memory controller of claim 2, further comprising:
    an ECC decider configured to receive the region data and determine whether to deliver data input to the memory controller to the ECC engine based on the region data.

4. The memory controller of claim 1, wherein the ECC region manager is configured to receive, from outside the memory controller, a region decision control signal for identifying the ECC enable regions.

5. The memory controller of claim 1, further comprising an ECC cache configured to store ECC data.

6. The memory controller of claim 5, wherein the ECC cache is configured to store the ECC data for each bank of the memory device.

7. The memory controller of claim 1, wherein the memory device includes a volatile memory device.

8. A memory system comprising:
    a memory device configured to include a plurality of memory pages; and
    a memory controller configured to control the memory device, wherein
        the memory controller is configured to manage the plurality of memory pages by dividing the plurality of memory pages into ECC enable regions and ECC disable regions and is configured to store ECC data and normal data in the ECC enable regions,
        each of ECC memory pages of the plurality of memory pages in the ECC enable regions comprises an ECC zone for storing the ECC data and a data zone for storing the normal data, and
        each of the ECC memory pages further comprises a dead zone that is neither the ECC zone nor the data zone.

9. The memory system of claim 8, wherein a ratio of a capacity of bytes occupied by the ECC zone to a capacity of bytes occupied by the data zone is 1:8.

10. The memory system of claim 8, wherein a capacity of each of the ECC memory pages is 2 KB,
    the capacity of the data zone is 1792 bytes,
    the capacity of the ECC zone is 224 bytes, and
    a capacity of the dead zone is 32 bytes.

11. The memory system of claim 8, further comprising:
    a memory module including a plurality of memory devices, at least one of the plurality of memory devices comprising the memory device,
    the plurality of memory devices including,
        a full-ECC memory device in which all memory pages are included in the ECC enable regions; and
        a full-non ECC memory device in which all memory pages are included in the ECC disable regions.

12. The memory system of claim 8, wherein the memory device includes a volatile memory device.

13. The memory system of claim 8, wherein the memory device and the memory controller are integrated on a System-on-a-Chip (SoC).

14. An application processor comprising:
    a processor; and
    a memory controller configured to control an external memory device comprising a plurality of memory pages, the memory controller configured to receive data addresses from the processor, the memory controller configured to receive data from the external memory device or the processor, and the memory controller configured to determine, based on the data address, whether to perform ECC operation on the received data,
    wherein the memory controller includes an ECC cache configured to store ECC data.

15. The application processor of claim 14, wherein the memory controller comprises:
    an ECC engine configured to perform the ECC operation; and
    an ECC decider configured to determine whether the ECC engine is to perform the ECC operation on the received data based on the data address,
    wherein the ECC decider is configured to transmit the received data to the ECC engine in response to the received data indicating to perform the ECC operation.

16. The application processor of claim 15, wherein the memory controller further comprises:
    an ECC region manager configured to manage the plurality of memory pages by dividing the plurality of memory pages into ECC enable regions and ECC disable regions.

17. The application processor of claim 16, wherein the processor is configured to transmit to the memory controller a region decision control signal for identifying the ECC enable regions and the ECC disable regions.

18. The application processor of claim 16, wherein
the ECC region manager is configured to store information on the ECC enable regions as region data, and
the ECC decider is configured to determine whether the ECC engines performs the ECC operation on the received data based on the data address and the region data.

19. The application processor of claim 16, wherein the processor is configured to determine whether the data requires the ECC operation,
the processor assigns the data address to the ECC enable regions in response to the data requiring the ECC operation, and
the processor assigns the data address to the ECC disable regions in response to the data not requiring the ECC operation.

20. The application processor of claim 15, wherein the external memory device includes a volatile memory device.

* * * * *